United States Patent [19]

Gusman et al.

[11] 3,903,255

[45] Sept. 2, 1975

[54] EFFERVESCENT POTASSIUM CHLORIDE TABLET

[75] Inventors: Samuel Gusman, Worthington; Demetrios Gregoriades, Columbus, both of Ohio

[73] Assignee: Rohm & Haas Company, Philadelphia, Pa.

[22] Filed: Oct. 11, 1974

[21] Appl. No.: 514,156

Related U.S. Application Data

[63] Continuation of Ser. No. 144,409, May 17, 1971, abandoned.

[52] U.S. Cl. ............... 424/44; 424/153; 424/316; 424/319
[51] Int. Cl. .................................. A61k 27/00
[58] Field of Search ............ 424/44, 153, 316, 319

[56] References Cited

UNITED STATES PATENTS

| | | | |
|---|---|---|---|
| 1,764,996 | 6/1930 | Andrews | 424/44 |
| 3,087,857 | 4/1963 | Davis et al. | 424/44 |
| 3,136,692 | 6/1964 | Bandelin | 424/44 |
| 3,337,404 | 8/1967 | Polli et al. | 424/44 |

FOREIGN PATENTS OR APPLICATIONS

| | | | |
|---|---|---|---|
| 6,805,840 | 10/1968 | Netherlands | 424/44 |
| 1,103,238 | 2/1968 | United Kingdom | 424/44 |

OTHER PUBLICATIONS

Physicians Desk Reference (PDR), 1968, pp. 765, 834.
Chemical Abstracts (1969), Vol. 71, 15998w.

*Primary Examiner*—Albert T. Meyers
*Assistant Examiner*—Norman A. Drezin

[57] ABSTRACT

An effervescent potassium chloride tablet for potassium replacement therapy comprises potassium bicarbonate or carbonate, an amino acid hydrochloride and potassium citrate, fumarate, phosphate or acetate in such proportions as to form a solution having an ionic composition equivalent to potassium chloride and a weak acid such as citric, fumaric or phosphoric acid. The amino nitrogen of the amino acid hydrochloride may be primary, secondary, tertiary or quaternary. The citric or other acid imparts a long-lasting, tangy flavor to the solution, which in conjunction with a citrus or other fruit flavoring tends to mask the salty taste of the potassium chloride. The tablet further includes between about 0.5 and 3 percent leucine as a tableting lubricant, polyethylene glycol and polyvinyl pyrrolidone as binders, and silica gel as excipient as well as coloring and sweeting agents, so that a palatable and appetizing-looking, sparkling clear effervescent solution is produced.

9 Claims, No Drawings

EFFERVESCENT POTASSIUM CHLORIDE TABLET

This is a continuation of Ser. No. 144,409 filed May 17, 1971, now abandoned.

BACKGROUND OF THE INVENTION

Certain disease conditions, as well as the administration of corticosteroids or thiazide diuretics, create an abnormally low level of potassium in the body. The symptoms of this condition, hypokalemia, are well known and include muscular weakness and cardiac disturbances. Treatment involves the replacement of potassium ion.

In some cases, the use of a potassium gluconate solution, such as Kaon Elixir (Warren-Teed) is quite satisfactory, but in many instances, supplementation with equivalent quantities of potassium and chloride ion simultaneously is necessary to achieve a balanced condition.

The use of enteric coated potassium chloride in tablet form has been common, but it has more recently been shown that lesions of the small bowel may be produced as a result of such therapy, apparently caused by the high localized concentration of potassium chloride as the tablet dissolves at the site of the intestinal wall.

One way of overcoming the harmful side effects associated with the administration of solid potassium chloride is to administer potassium chloride in aqueous solution. Kaochlor liquid (Warren-Teed) is such a product. However, the disadvantages associated with liquid pharmaceutical products are well known: the shipping of liquids is preferably avoided due to lower weight-to-efficacy ratios, they are not convenient to the ambulatory or working patient, and breakage and leakage always present potential hazards. Furthermore, space on the pharmacist's supply shelves is always at a premium and is not used to advantage by liquid products.

Since a compressed tablet of potassium chloride is slow to dissolve, a preferable dry form intended for administration in solution is an effervescent composition. Bubbles of carbon dioxide produced by reaction between a carbonate or bicarbonate and an acid serve to speed dissolution of a tablet and result in a mildly carbonated solution which greatly improves the palatability.

Such an effervescent potassium composition, comprising potassium bicarbonate, potassium chloride, citric acid, fillers and sweetening agents, is disclosed in U.S. Pat. No. 3,337,404. The solution it produces is essentially a mixture of potassium citrate, potassium bicarbonate and potassium chloride, which necessarily has an excess of potassium ion over the amount of chloride provided. Since it is therapeutically preferable to administer equivalent amounts of potassium and chloride, an alternative formulation would be desirable.

Belgian Pat. No. 714,334 teaches an effervescent formulation which provides equivalent amounts of potassium and chloride ions by employing potassium bicarbonate and betaine hydrochloride as active ingredients. The betaine hydrochloride provides the free hydrochloric acid necessary to produce the effervescence. The tablet contains insoluble excipients as required for compression of the tablet.

It has been found in practice that an unappetizing turbidity and scum are formed in solutions produced by tablets prepared in accordance with the Belgian Patent. This is due to the presence of the tableting lubricants stearic acid and magnesium stearate as insoluble matter dispersed through the solution and floating to the top. The lubricant is needed to keep the tablets from sticking to the punches and die walls during or after compaction.

British Pat. No. 1,103,238 adds emphasis to the problems inherent in forming a tablet of an effervescent potassium composition. It teaches the use of a tableting punch having its operative faces specially lined with a resilient plastic or rubbery material, apparently because the disclosed formulation tends to stick to conventional metal punch faces and possibly because of difficulty in the compression of the required large tablets. Also, the disclosed formulation fails to provide equivalent amounts of potassium and chloride ions, as is therapeutically preferable.

DESCRIPTION OF THE INVENTION

The improved effervescent potassium chloride tablet of the present invention releases equivalent amounts of potassium and chloride ions, forming a sparkling, visually clear solution in use. The solution is buffered to a tangy-tasting acid pH.

Production of tablets according to the present invention is conveniently performed with unmodified conventional tableting equipment. The formulation is free of the tendency of sticking to the punch faces and at the same time is easily compressed into an integral, cohesive tablet.

The present effervescent tablets comprise a potassium source, either the bicarbonate or the carbonate, and a source of chloride as the hydrochloric acid salt in chemically equivalent amounts. The chloride source is an amino acid hydrochloride, wherein the amino nitrogen may be primary, as in the physiologically occurring amino acids, or it may be secondary, tertiary, or even quaternary as in betaine.

When dissolved in water, these two components produce carbonic acid, which gives the solution a tangy, acidic flavor and helps to mask the salty taste of the potassium chloride. Soon afterwards, however, most of the carbonic acid breaks down into carbon dioxide and water, and the pH of the solution tends to return to neutral. The patient waits until the tablet has dissolved entirely before drinking the solution. Yet as soon as the fizzing stops, the solution starts to lose its acidity and takes on a taste which is increasingly salty and "flat-tasting."

We have found that the aqueous solution can be kept from becoming unpalatable and flat-tasting by incorporating in the tablet substances which will maintain the solution at a mildly acidic pH, even after substantially all of the carbon dioxide has been released. More particularly, we have found it desirable to provide for the formation of a weak acid which tends to maintain the final, degassed solution at a pH of between about 3.0 and 4.5.

The present invention provides for the formation of a weak acid, preferably citric acid but alternatively fumaric, phosphoric or acetic acid, or generally any pharmaceutically acceptable weak acid having a stable potassium salt for incorporation in our tablet formulation. This gives the solution a pleasant, tart flavor which helps to mask the salty flavor of the solution.

We have further found that the incorporation of citrus flavoring, i.e. natural or synthetic oil of lemon, orange, etc., tends further to enhance the palatability of the resulting solution, providing a pleasant taste which naturally harmonizes with that of the citric acid. Alternatively, other "sour" fruit flavors may be employed to particular advantage.

Although there are teachings in the prior art that citric acid may be incorporated in the formulation an effervescent potassium tablet, we have found it undesirable to employ such a formulation. Tablets formulated with anhydrous citric acid were found to have poor stability. Furthermore, when we attempted to make a granulation containing citric acid with our preferred formulation containing soluble binders and lubricants, as discussed more fully hereinbelow, the granulation became sticky and plastic, and we found it impossible to compress into tablets.

We have found a formula for an effervescent potassium chloride tablet which is compatible with conventional tableting techniques and yet which has both improved therapeutic properties and palatability. It contains no citric acid and thereby obviates the problem just mentioned. Yet by generating citric or other weak acid in solution, it provides the benefits previously discussed. Our preferred formula provides the starting materials for the following reaction:

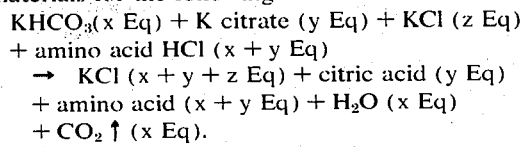

The expressions in parentheses represent the number of chemical equivalents of each reactant and product. It is evident from the reaction formula that the amount of KCl in the tablet, z equivalents, is entirely optional and may be freely adjusted from a low of zero to a maximum limited only by the size of the tablet. Furthermore, the amounts of $KHCO_3$ (x equivalents) and potassium citrate (y equivalents) are substantially independent, so long as sufficient amino acid hydrochloride is available to react with both of them (x + y equivalents).

Nevertheless, we have found that the optimum amounts of effervescence and acidity are provided when the ratio of x to y is between about 2:1 and 15:1, and more preferably between about 3:1 and 8:1.

The amount and rate of effervescence is controlled in several ways, but most basically by the amount of effervescent material employed, in comparison with non-effervescing ingredients. It is important to provide sufficient agitation to aid the tablet to dissolve completely, yet the vigor and duration of the effervescence should be limited to reasonable amounts. The ratio of potassium bicarbonate to potassium chloride (x to z) is desirably between about 1:2 and 2:1 to limit the size of the tablet. Acceptable formulations are readily developed in which even more potassium bicarbonate (up to 1:0) is employed, with the rate of effervescence being limited by slow-dissolving binders.

An entirely acceptable alternative to the reaction shown above would be to substitute potassium carbonate for the potassium bicarbonate, as follows:

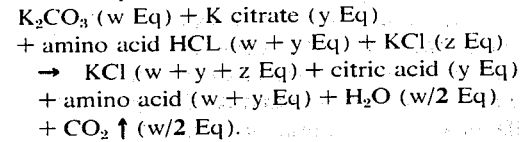

Since half as much effervescence is produced for each equivalent of $K_2CO_3$ as for $KHCO_3$, the values of w should desirably be approximately twice as great as corresponding values of x as discussed hereinabove.

An acceptable alternative to the y equivalents of potassium citrate set forth in either of the two above equations would be to use a chemically equivalent amount of a potassium salt of pharmaceutically acceptable weak acid other than citric. As used herein, the term "weak acid" refers to an acid having the $pK_A$ value of its first ionization step no smaller than 2.0 and most preferably between about 2.7 and 3.4. In the case of polybasic acids, it is acceptable to use a partial salt of potassium such as potassium monohydrogen phosphate or potassium bifumarate, the number of equivalents of the ingredient being measured by the amount of potassium it contains.

For example, potassium acetate may be employed for this purpose, especially if the flavoring is formulated to compensate for the vinegar taste imparted by the acetic acid. Similarly, potassium salts of tartaric acid are acceptable, though not preferred because they tend to form a cloudy precipitate.

The amino acid hydrochlorides which may be incorporated in the tablets of the present invention include the hydrochlorides of the full range of pharmaceutically acceptable compounds having an amine functional group and an acid functional group. The amine group may be primary, or it may contain additional substitution, as by lower alkyl groups, so as to be secondary, tertiary, or even quaternary. In the event that the group is quaternary, the compound is a zwitterion.

Primary amino acids having hydrochlorides suitable for incorporation in the present formulations include glycine, alanine, valine, leucine, isoleucine, phenylalanine, tryptophan, serine, threonine, glutamine, cysteine, methionine, proline, hydroxyproline, p-aminobenzoic acid, aspartic acid, lysine, arginine, etc.

Secondary and tertiary amino acids having hydrochlorides suitable for incorporation in the present formulations include the soluble N- lower alkyl substituted products of the compounds mentioned above, such as N-methyl- and N,N-diethylglycine, N-methylglutamic acid, N,N-dimethylalanine, N-propylvaline, N-ethyl-N-methyl-p-aminobenzoic acid, etc.

Quaternary amino acid zwitterion hydrochlorides suitable for incorporation in the present formulations include compounds of the formula

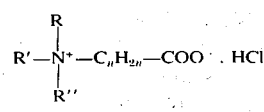

wherein R, R' and R'' are lower alkyl groups and n is a small integer, preferably from 1 to 3. When R, R' and R'' are each methyl and $n = 1$, this formula represents betaine hydrochloride.

In addition to the active ingredients, we employ a special soluble tableting lubricant, binders, an excipient, coloring and flavoring.

A lubricant is required in tablet formulations in order to provide for the release of the compressed tablet from the punch faces or die walls without sticking. Lubricants used in prior art effervescent potassium chloride tablets, i.e. stearic acid, mineral oil and magnesium stearate, are insoluble and disperse through the solution producing an unappetizing turbidity and/or scum. We have found a material which is pharmaceutically acceptable and is compatible with the other components of the formulation, which provides the required lubricant effect, and also uniquely soluble, so that the unappetizing turbidity caused by prior art lubricants is eliminated. This material is leucine, which may be employed as a racemic mixture, DL-leucine, or as either the D or L stereoisomer.

We have found that the use of a soluble lubricant in the formulation aggravates the previously mentioned problems associated with the use of citric acid. Thus, the use of potassium citrate and additional amino acid hydrochloride in the present formulation is even more necessary by the present introduction of leucine as the tableting lubricant.

The binders of a tablet formulation provide compressibility to the granulation and cohesive strength to the finished tablet. We employ a mixture of two materials: polyvinyl pyrrolidone of approximate molecular weight 4000 (Plasdone, GAF Corp.) and polyethylene glycol (Carbowax 4000 or 6000, Union Carbide Corp.). Carbowax 4000 has a molecular weight of 3000–3700. Carbowax 6000 has a molecular weight of 6000–7500. We have found that the polyethylene glycol appears to dissolve entirely and does not contribute to turbidity of the solution. Furthermore, we have found that it tends to reduce undesirable foaming of the effervescing solution and improves the compressibility of the mixture during tableting. Of the two grades of Carbowax, we have found the 6000 slightly preferable, even though it is less soluble than the 4000 grade, because it produces a harder tablet which is more resistant to moisture.

Desirably, the weight ratio of polyvinyl pyrrolidone to polyethylene glycol is from about 1:2 to 2:1. The total amount of binder in the present formulation is desirably from about 1 to about 15 percent of the total weight of the tablet and preferably between 2 and 6 percent.

We have found it advantageous to employ a citrus fruit flavoring in the present formulation. Taken in conjunction with the citric acid generated in situ as discussed hereinabove, this flavoring tends to mask the salty taste of the KCl. Any natural or synthetic citrus flavoring may be used, e.g. orange, lemon, lime, or grapefruit. As an alternative, other flavors could be used, e.g. raspberry, grape, sour cherry, etc. Suitable food grade coloring is added to enhance the effect of the flavoring and to provide an appetizing color to the effervescing solution.

A small amount of finely powdered silica gel is optionally incorporated in the formulation to improve the flow characteristics of the mixture during tableting. This material should be less than 1 percent of the weight of the tablet and preferably between about 0.1 and 0.3 percent. An additional advantage of the silica gel is that it tends to adsorb the volatile components of the flavoring, thereby lending stability to the overall flavor and improving shelf life, but this purpose could alternately be served by using encapsulated flavors. For the purpose of producing a clear solution, it is desirable to use the silica gel in finely powdered form, i.e. in particles of a few microns diameter or less, so that the particles are not apparent in the final solution.

The tablets of the present invention may readily be prepared in a variety of sizes for various dosages, ranging for example from 5 milliequivalents of KCl per tablet to 50 milliequivalents. A particularly readily handled and reasonably potent size for the tablet provides 20 milliequivalents of the active compound.

In use, one or more tablets are permitted to dissolve in a glass of water (e.g. 3 to 16 fluid ounces). After the active effervescence stops, the resulting pleasant-tasting, appetizing-looking solution is administered to the patient, thereby providing the benefits of a potassium chloride solution.

The following examples further illustrate some of the formulations comprehended by the present invention.

EXAMPLE 1

|   | Per 10 tablets, gm. | Per tablet, m Eq. |
|---|---|---|
| A — Glycine hydrochloride | 13.38 | 12 |
| B — Potassium chloride | 5.97 | 8 |
| C — Potassium bicarbonate | 10.01 | 10 |
| D — Potassium citrate | 2.16 | 2 |
| E — Polyvinyl pyrrolidone (Plasdone) | 0.77 |   |
| F — Polyethylene glycol (Carbowax 6000) | 1.15 |   |
| G — Saccharin | 0.20 |   |
| H — Silica gel (Cab-O-Sil) | 0.05 |   |
| I — DL-leucine (pulverized) | 0.34 |   |
| J — Coloring | 0.03 |   |
| K — Flavoring | 0.05 |   |
| L — Isopropyl alcohol | 6.0 ml. |   |

Grind together A, B, C and D and mix the ground materials in a mixer for 15 to 20 minutes. Granulate the mixed powders with a solution of L, E, F, G and J. Spread the granulation on trays and dry at 50°–55° C. until alcohol odor is gone. Screen through a No. 12 mesh screen. Place granulation in blender and blend in H and K. As lubricant, blend in I. If necessary, up to double the stated amount of lubricant (I) may be added, adjusting total weight of tablet to maintain dosage level. Compress 3.41 gm. of formula using 1 inch diameter, flat, bevel-edge punches in standard reciprocating or rotary tableting machine, e.g. a Stokes machine to form tablet, 0.21 inch thick.

Example 2

Sarcosine hydrochloride (15.06 gm.) is substituted for glycine hydrochloride (13.38 gm.) in the formula of Example 1. The amount of leucine in I is adjusted upwards to remain at 1 per cent of the formula weight, and the thickness of the tablet is adjusted to compensate for the additional weight of ingredients per tablet.

Example 3

N,N-dimethylglycine hydrochloride (16.75 gm.) is substituted for glycine hydrochloride (13.38 gm.) in the formula of Example 1. The amount of leucine and tablet thickness are adjusted as in Example 2.

Example 4

Betaine hydrochloride (18.44 gm.) is substituted for glycine hydrochloride (13.38 gm.) in the formula of Example 1. The amount of leucine and tablet thickness are adjusted as in Example 2.

Example 5

Alanine hydrochloride (15.06 gm.) is substituted for glycine hydrochloride (13.38 gm.) in the formula of Example 1. The amount of leucine and tablet thickness are adjusted as in Example 2.

Example 6

N-methylalanine hydrochloride (16.75 gm.) is substituted for glycine hydrochloride (13.38 gm.) in the formula of Example 1. The amount of leucine and tablet thickness are adjusted as in Example 2.

Example 7

Potassium monohydrogen phosphate (1.74 gm.) is substituted for potassium citrate (2.16 gm.) in the formula of Example 1. The amount of leucine and tablet thickness are adjusted as in Example 2, but downwards.

Example 8

Potassium acetate (1.96 gm.) is substituted for potassium citrate (2.16 gm.) in the formula of Example 1. The amount of leucine and tablet thickness are adjusted as in Example 2, but downwards.

Example 9

Potassium fumarate (1.92 gm.) is substituted for potassium citrate (2.16 gm.) in the formula of Example 1. The amount of leucine and tablet thickness are adjusted as in Example 2, but downwards.

Example 10

Potassium chloride (5.97 gm.) is omitted from the formula of Example 1, and the amount of leucine and tablet size are adjusted proportionately downwards. Each tablet provides 12 milliequivalents of potassium chloride.

Example 11

| | Per 10 tablets, gm. | Per tablet, m Eq. |
| --- | --- | --- |
| N — Saccharin | 0.100 | |
| O — Polyvinyl pyrrolidone (Plasdone) | 0.383 | |
| P — Polyethylene glycol (Carbowax 6000) | 0.575 | |
| Q — Betaine hydrochloride | 9.22 | 6 |
| R — Potassium bicarbonate | 5.00 | 5 |
| S — Potassium chloride | 2.98 | 4 |
| T — Potassium citrate | 1.08 | 1 |
| U — Coloring | 0.015 | |
| V — Flavoring | 0.025 | |
| W — Silica gel (Cab-O-Sil M-5) | 0.025 | |
| X — DL-leucine | 0.194 | |
| Y — Isopropyl alcohol | 3.00 ml. | |

Place Y in a container and with agitation add N, O and P. Heat until a clear solution is obtained. In a separate mixer, blend Q, R, S and T. Then slowly add the solution of Y, N, O and P, and granulate the mix. Place the mix on drying trays and warm-air dry until the alcohol odor is gone and the moisture level is below 0.3 percent and preferably below 0.2 percent. Grind the material and screen through a No. 12 mesh screen. Place the material in a blender and blend in U, V, W and X. Compress 1.96 gm. of formula using three-fourths inch diameter, flat, bevel-edge punches to form tablet 0.214 inch thick. Each tablet provides 10 milliequivalents of potassium chloride.

Having thus described the invention, what it is desired to claim and secure by letters patent is:

1. A tablet for producing an effervescent solution to be administered as potassium replacement therapy which consists essentially of
   i. x equivalents of potassium bicarbonate,
   ii. y equivalents of a potassium salt of citric, fumaric, tartaric, phosphoric or acetic acid,
   iii. x + y equivalents of a pharmaceutically acceptable hydrochloride of an amino acid selected from the group consisting of the hydrochloride of glycine the hydrochloride of sarcosine, the hydrochloride of N,N-di-methylglycine, the hydrochloride of alanine, the hydrochloride of betaine and the hydrochloride of N-methylalanine,
   iv. z equivalents of potassium chloride,
   v. binder in an amount between about 1 and 15 percent of the total weight, and
   vi. leucine as a tableting lubricant in an amount between about 0.5 and 3 percent of the total weight, wherein the ratio of x to y is between about 2:1 and 15:1, the ratio of x to z is between about 1:2 and 2:1 and the sum of x + y + z provides between about 5 and 50 milliequivalents of potassium chloride.

2. A tablet as claimed in claim 1, wherein the binder is a mixture of polyvinyl pyrrolidone and polyethylene glycol.

3. A tablet as claimed in claim 2 wherein the polyvinyl pyrrolidone and polyethylene glycol are present in a ratio of between about 2:1 and about 1:1.

4. A tablet as claimed in claim 1 comprising up to 1 percent of finely powdered silica gel.

5. A tablet as claimed in claim 1, further comprising a food grade coloring and fruit flavoring.

6. A tablet as claimed in claim 5, wherein the flavoring is natural or synthetic orange, lemon, lime, or grapefruit and the coloring is substantially the color of the citrus fruit of the flavoring.

7. A tablet for producing an effervescent solution to be administered as potassium replacement therapy which consists essentially of
   i. w equivalents of potassium carbonate,
   ii. y equivalents of a potassium salt of citric, fumaric, tartaric, phosphoric or acetic acid,
   iii. w + y equivalents of a pharmaceutically acceptable hydrochloride of an amino acid selected from the group consisting of the hydrochloride of glycine, the hydrochloride of sarcosine, the hydrochloride of N,N-di-methylglycine, the hydrochloride of alanine, the hydrochloride of betaine and the hydrochloride of N-methylalanine,
   iv. z equivalents of potassium chloride,
   v. binder in an amount between about 1 and 15 percent of the total weight, and
   vi. leucine as a tableting lubricant in an amount between about 0.5 and 3 percent of the total weight, wherein the ratio of w to y is between about 4:1 and 30:1, the ratio of w to z is between about 1:1 and 4:1 and the sum of w + y + z provides between about 5 and 50 milliequivalents of potassium chloride.

8. A tablet as claimed in claim 7 wherein the binder is a mixture of polyvinyl pyrrolidone and polyethylene glycol.

9. A tablet as claimed in claim 7 comprising up to 1 percent of finely powdered silica gel.

* * * * *